United States Patent
Suzuka

(10) Patent No.: US 8,619,145 B2
(45) Date of Patent: Dec. 31, 2013

(54) POSITION CONTROLLER FOR IMAGE-STABILIZING INSERTABLE/REMOVABLE OPTICAL ELEMENT

(75) Inventor: Shinya Suzuka, Saitama (JP)

(73) Assignee: Hoya Corporation, Tokyo (JP)

( * ) Notice: Subject to any disclaimer, the term of this patent is extended or adjusted under 35 U.S.C. 154(b) by 157 days.

(21) Appl. No.: 13/372,987

(22) Filed: Feb. 14, 2012

(65) Prior Publication Data
US 2012/0218428 A1   Aug. 30, 2012

(30) Foreign Application Priority Data
Feb. 28, 2011 (JP) ................................ 2011-042027

(51) Int. Cl.
  *H04N 5/228* (2006.01)
(52) U.S. Cl.
  USPC .............. 348/208.11; 348/208.99; 348/208.4; 348/208.5; 348/208.7
(58) Field of Classification Search
  USPC .................. 348/208.99, 208.4, 208.5, 208.7, 348/208.11
  See application file for complete search history.

(56) References Cited

U.S. PATENT DOCUMENTS

| | | | |
|---|---|---|---|
| 8,090,249 B2 | 1/2012 | Suzuka | |
| 8,121,467 B2 | 2/2012 | Suzuka | |
| 8,203,612 B2 * | 6/2012 | Ito et al. | 348/208.12 |
| 8,275,249 B2 * | 9/2012 | Imura et al. | 396/55 |
| 2011/0013029 A1 * | 1/2011 | Akutsu et al. | 348/208.11 |
| 2011/0103783 A1 * | 5/2011 | Tsutsumi et al. | 396/55 |

FOREIGN PATENT DOCUMENTS

JP   2007-101993   4/2007

OTHER PUBLICATIONS

U.S. Appl. No. 13/352,564 to Shinya Suzuka, filed Jan. 18, 2012.
U.S. Appl. No. 13/372,938 to Shinya Suzuka, filed Feb. 14, 2012.
U.S. Appl. No. 13/372,955 to Shinya Suzuka, filed Feb. 14, 2012.
U.S. Appl. No. 13/372,969 to Shinya Suzuka, filed Feb. 14, 2012.
U.S. Appl. No. 13/402,065 to Shinya Suzuka, filed Feb. 22, 2012.
U.S. Appl. No. 13/402,072 to Shinya Suzuka, filed Feb. 22, 2012.

* cited by examiner

*Primary Examiner* — Anthony J Daniels
(74) *Attorney, Agent, or Firm* — Greenblum & Bernstein P.L.C.

(57) ABSTRACT

A position controller for an image-stabilizing optical element in a optical system includes an advancing/retracting member; an anti shake frame supported by the advancing/retracting member and movable along a plane orthogonal to the optical axis; an insertable/removable frame holding the optical element and supported by the anti-shake frame to be movable between insertion and removed positions; an anti shake drive mechanism which drives the anti shake frame to perform an image-stabilizing operation; and a removal drive mechanism which imposes no movement limitations on the anti shake frame and the insertable/removable frame in a ready-to-photograph state, and which imparts a component force that moves the insertable/removable frame to the removed position in association with the insertable/removable frame when the advancing/retracting member moves to an accommodated position.

8 Claims, 14 Drawing Sheets ant-shake frame to be movable along a plane
POSITION CONTROLLER FOR IMAGE-STABILIZING INSERTABLE/REMOVABLE OPTICAL ELEMENT

BACKGROUND OF THE INVENTION

1. Field of the Invention

The present invention relates to a position controller for an optical element which can be moved to correct image shake and removed to a position outside an anti-shake driving range of the optical element.

2. Description of the Related Art

There has been an increasing number of optical devices such as cameras which are equipped with an anti-shake mechanism (image shake correcting mechanism/image stabilizing mechanism) that moves a specific optical element such as a lens element or an image sensor (image pickup device) in a plane orthogonal to an optical axis of an optical system to reduce (correct) image shake. In Japanese Unexamined Patent Publication 2007-101993, a technique for removing (radially retracting) an image-stabilizing optical element to a position outside an anti-shake driving range (to a position off an optical axis of the optical system) when an optical device that incorporates the anti-shake mechanism moves from an operating state to a lens barrel accommodated state (fully retracted state/non-operating state) in which no pictures are taken, has been proposed for the purpose of making a lens barrel compact in size.

In order to miniaturize such an optical device, a mechanism for removing the image-stabilizing optical element to a removed position away from an optical axis also needs to be miniaturized. In the lens barrel disclosed in the aforementioned Japanese Unexamined Patent Publication, a driven member which is driven in a plane substantially orthogonal to an optical axis to correct image shake is provided thereon with a rotatable frame which holds a lens element (image-stabilizing optical element), and the rotatable frame is rotated to move the lens element to a removed position away from the optical axis with the driven member fixed at the center of the anti-shake driving range thereof (i.e., centered thereon) when the lens barrel is brought into the lens barrel accommodated state (fully retracted state). According to this structure, the amount of rotation of the rotatable frame corresponds to the removing amount of the lens element; however, if the amount of rotation of the rotatable frame is great, the driven member that holds the rotatable frame becomes great in size or the shape of the driven member becomes complicated. Therefore, it is desirable that the amount of rotation of the rotatable frame be reduced as small as possible to achieve miniaturization of the image-stabilizing optical element removing mechanism, specifically in radial directions from the optical axis.

SUMMARY OF THE INVENTION

The present invention has been devised in view of the above-mentioned drawbacks and provides a small-sized (compact) position controller for controlling the position of an optical element which can be driven within an anti-shake driving range to reduce image shake in a ready-to-photograph state and which can also be removed from the anti-shake driving range.

According to an aspect of the present invention, a position controller is provided, for an image-stabilizing optical element which is provided in a photographing optical system which moves between a ready-to-photograph state and an accommodated state in which no pictures are taken, the position controller including an advancing/retracting member movable in an optical axis direction of the photographing optical system, wherein the advancing/retracting member is moved between a first position at which the photographing optical system is in the ready-to-photograph state and a second position at which the photographing optical system is in the accommodated state; an anti-shake frame supported by the advancing/retracting member to be movable along a plane orthogonal to the optical axis; an insertable/removable frame which holds the optical element and is supported by the anti-shake frame to be movable between an insertion position in which the optical element is positioned on the optical axis and a removed position in which the optical element is removed from the optical axis; an anti-shake drive mechanism which drives the anti-shake frame to perform an image-stabilizing operation in accordance with vibrations applied to the photographing optical system; and a removal drive mechanism which imposes no limitations on movements of the anti-shake frame and the insertable/removable frame that are caused by the anti-shake drive mechanism in the ready-to-photograph state, and which imparts a component force that makes the insertable/removable frame move to the removed position from a moving force of the advancing/retracting member to move the anti-shake frame in a direction toward the removed position in association with the insertable/removable frame when the advancing/retracting member moves in the optical axis direction from the first position to the second position.

It is desirable for the position controller to include an anti-shake guide member installed between the advancing/retracting member and the anti-shake frame, the anti-shake guide member allowing the anti-shake frame to move in the plane in a state of being held between the advancing/retracting member and the anti-shake frame; a first biaser which biases the advancing/retracting member and the anti-shake frame in directions along the optical axis to approach each other to make the anti-shake guide member remain held between the advancing/retracting member and the anti-shake frame; a second biaser which biases and moves the insertable/removable frame toward the insertion position; and a movement limiter which limits a moving range of the anti-shake frame at least toward the removed position. A resistance to movement of the insertable/removable frame toward the removed position that is caused by the second biaser is greater than a resistance to movement of the anti-shake frame relative to the anti-shake guide member that is created by the first biaser. The removal drive mechanism continues moving the anti-shake frame with the insertable/removable frame in a direction to move the insertable/removable frame to the removed position until the anti-shake frame is prevented from moving by the movement limiter, and subsequently moves the insertable/removable frame solely to the removed position.

It is desirable for the movement limiter to include a projection which projects from one of the advancing/retracting member and the anti-shake frame in the optical axis direction, and a hole which is formed in the other of the advancing/retracting member and the anti-shake frame so that the projection is loosely fitted in the hole.

It is desirable for the position controller to include a position detection sensor which detects a position of the anti-shake frame that is driven by the anti-shake drive mechanism, wherein the position controller calibrates the position detection sensor with a position at which the projection comes into contact with an inner wall of the hole as a reference position.

It is desirable for the insertable/removable frame to be supported by the anti-shake frame to be rotatable about a first rotational shaft that is parallel to the optical axis. The removal drive mechanism includes a rotational relay member which is supported by the advancing/retracting member to be rotatable about a second rotational shaft that is parallel to the first rotational shaft, the rotational relay member coming into contact with the insertable/removable frame by rotating toward the removed position; and a pressing member which comes into contact with and presses the rotational relay member to rotate the rotational relay member toward the removed position when the advancing/retracting member moves from the first position to the second position.

It is desirable for a clearance to be formed between the rotational relay member and the insertable/removable frame to prevent the rotational relay member and the insertable/removable frame from coming in contact with each other when the anti-shake frame is driven by the anti-shake drive mechanism in the ready-to-photograph state.

It is desirable for the anti-shake drive mechanism to include an electromagnetic actuator including at least one magnet and at least one coil.

It is desirable for the first biaser to include at least one extension spring, and for the second biaser to include a torsion coil spring.

It should be noted that neither of the first position and the second position of the advancing/retracting member is limited to a single specified position with respect to the optical axis direction, and each includes the case where the optical axis position thereof changes at the ready-to-photograph state or at the accommodated state. For example, in the case where the present invention is applied to a zoom lens system which performs zooming by moving the advancing/retracting member in the optical axis direction, the first position can refer to any position within the moving range along the optical axis direction during zooming in the ready-to-photograph state. Similarly, the second position can refer to any position of the advancing/retracting member within a predetermined range along in the optical axis direction in the accommodated state.

According to the present invention, the anti-shake frame is moved (driven) in a direction toward the removed position of the insertable/removable frame by the movement of the insertable/removable frame to the removed position so that the amount of movement of the insertable/removable optical element to remove the insertable/removable optical element from a position on an optical path (the optical axis) is shared between the insertable/removable frame and the anti-shake frame, and accordingly, the position controller for the insertable/removable optical element can be miniaturized to a greater degree than that in the case where the aforementioned amount of movement of the insertable/removable optical element is secured solely by the insertable/removable frame.

The present disclosure relates to subject matter contained in Japanese Patent Application No. 2011-42027 (filed on Feb. 28, 2011) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
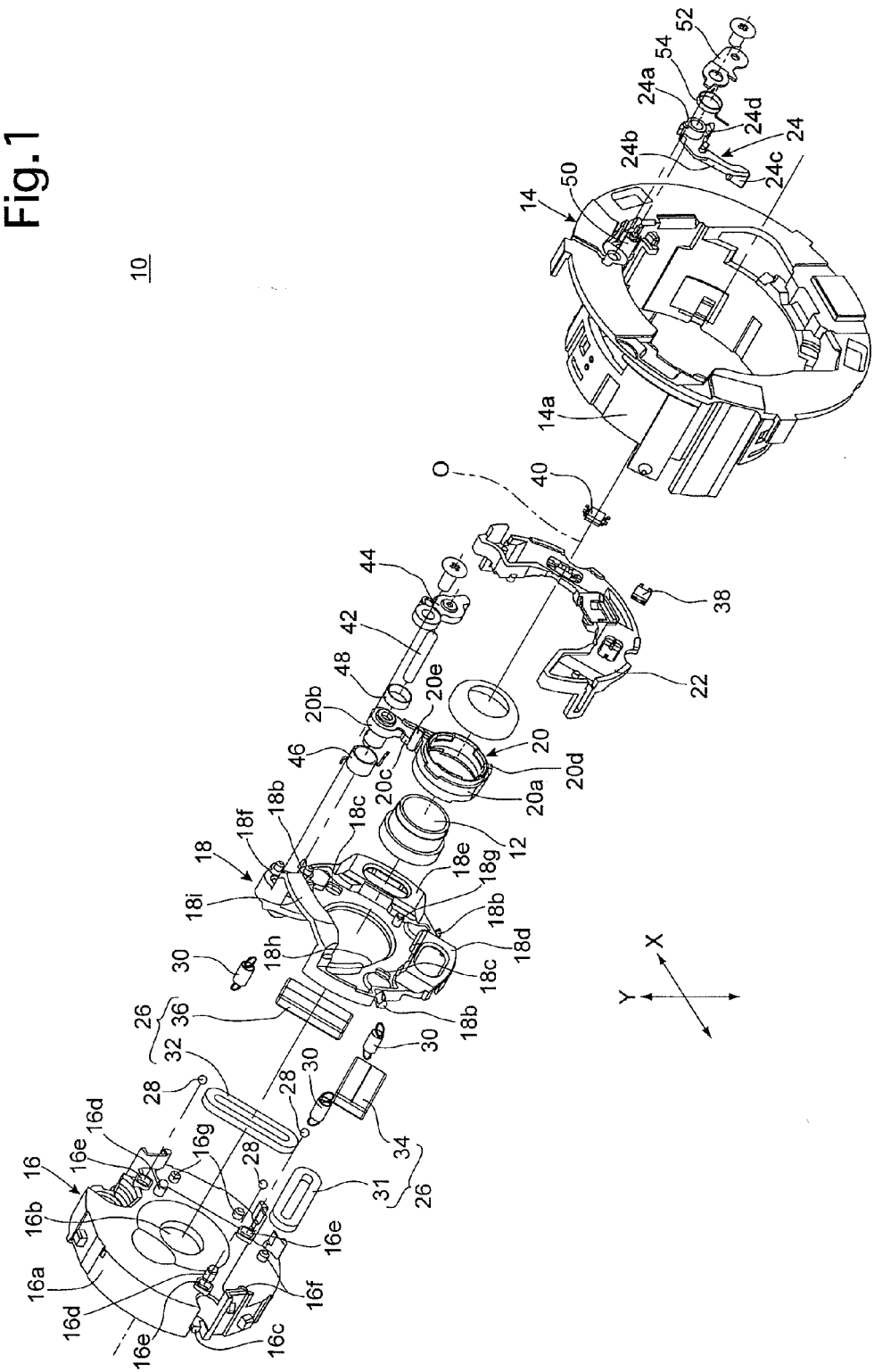
FIG. 1 is a rear exploded perspective view of an embodiment of an anti-shake lens unit according to the present invention that is designed for a lens shutter camera having a retractable photographic lens.
Figure 2:
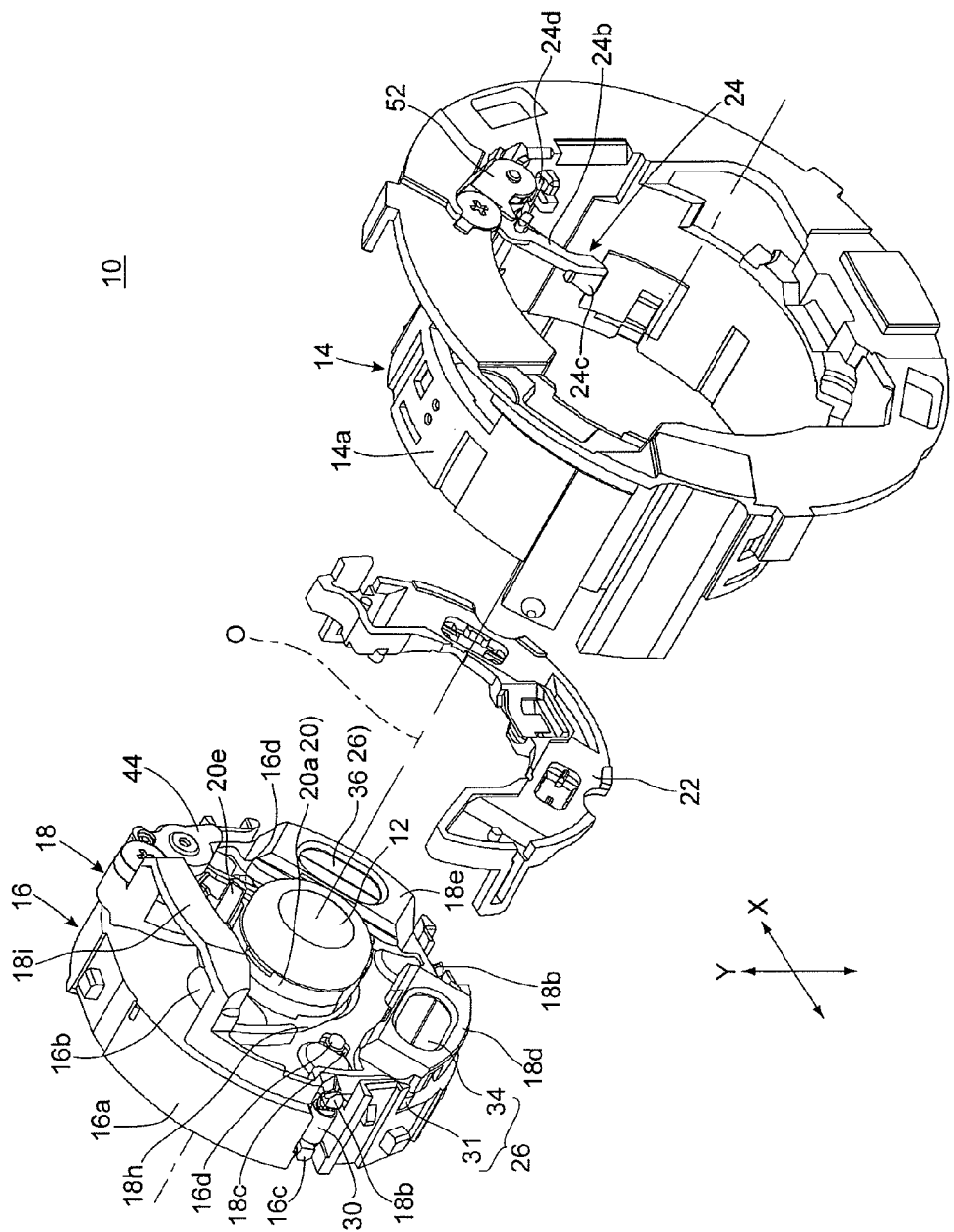
FIG. 2 is an exploded rear perspective view of the anti-shake lens unit with a sensor holder and a linear moving ring dismounted.
Figure 3:
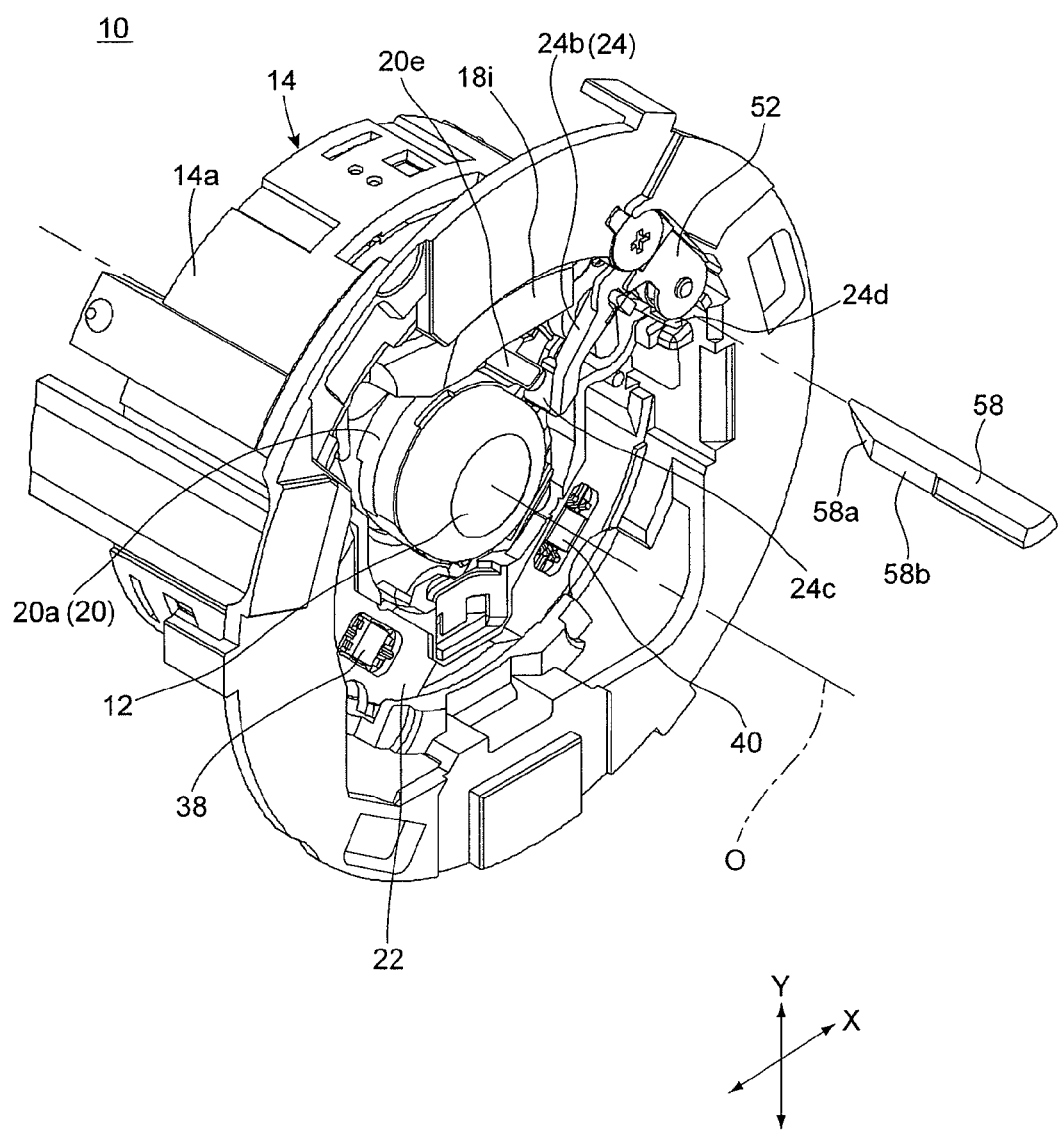
FIG. 3 is a rear perspective view of the anti-shake lens unit and a insertion/removal control-projection in the middle of the lens barrel retracting operation of the lens barrel.
Figure 4:
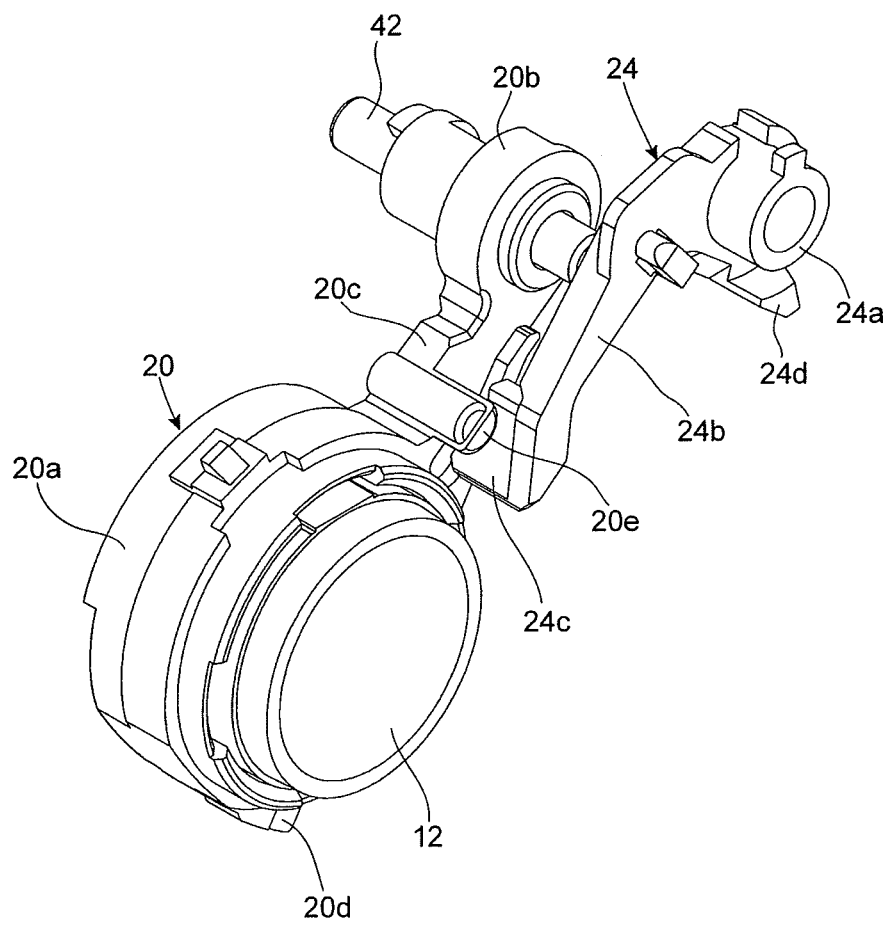
FIG. 4 is a rear perspective view of an insertable/removable frame and a removal drive lever, showing the positional relationship therebetween in a ready-to-photograph state of the lens barrel.
Figure 5:
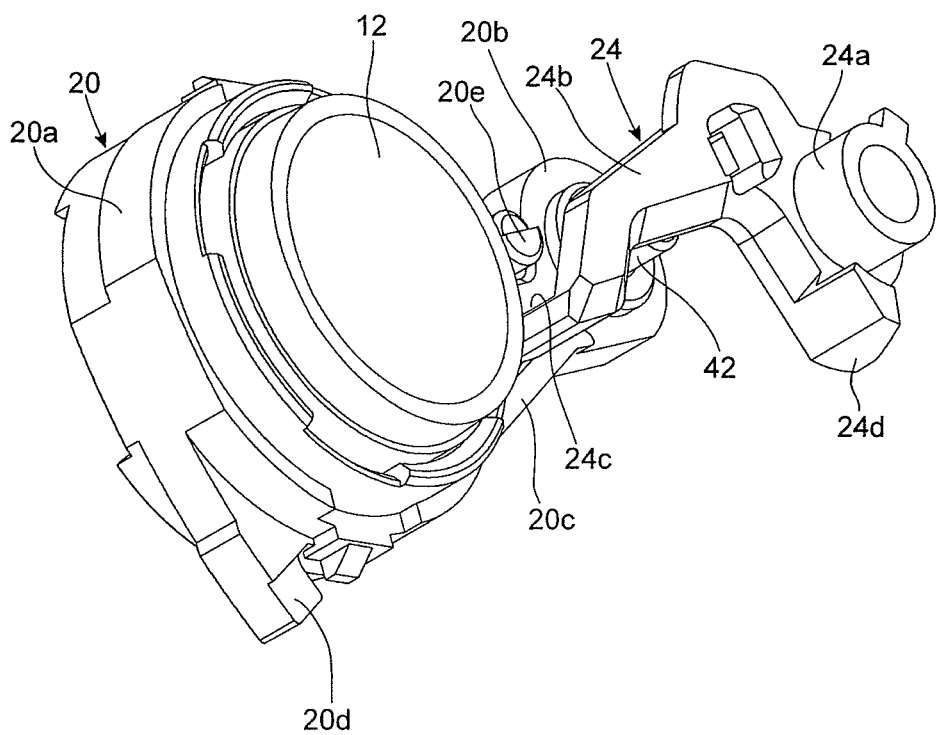
FIG. 5 is a rear perspective view of the insertable/removable frame and the removal drive lever in the ready-to-photograph state of the lens barrel, viewed from a different angle.

An anti-shake lens unit 10 shown in FIGS. 1 through 3 supports an insertable/removable image-stabilizing lens (insertable/removable image-stabilizing optical element) 12 which constitutes a part of a photographing optical system of a lens barrel of a camera. As shown in FIG. 1, the anti-shake lens unit 10 is provided with a linear moving ring (advancing/retracting member) 14, and is provided in the linear moving ring 14 with a shutter unit (advancing/retracting member) 16, an anti-shake frame 18, an insertable/removable frame 20, a sensor holder 22, a removal drive lever (removal drive mechanism/rotational relay member) 24 and an anti-shake drive actuator (anti-shake drive mechanism) 26.

Although the overall structure of the lens barrel in which the anti-shake lens unit 10 is incorporated is not shown in the drawings, the linear moving ring 14 is supported inside the lens barrel thereby in a manner to be linearly movable in a direction along a photographing optical axis O of the photographing optical system, and the linear moving ring 14 is moved toward an image plane (second position) from the object side (first position) when the lens barrel is brought into a lens barrel accommodated state (fully retracted state) from a ready-to-photograph state. In the following descriptions, the optical axis direction refers to a direction along or parallel to the photographing optical axis O, and the front and the rear refer to the front (object side) and the rear (image plane side) with respect to the optical axis direction. A known cam mechanism or the like can be adapted as a mechanism for moving the linear moving ring 14 in the optical axis direction.

The linear moving ring 14 is provided with a cylindrical portion 14a which surrounds the photographing optical axis O, and the shutter unit 16 is fixed to the inside of the cylindrical portion 14a. The shutter unit 16 is provided with a shutter housing 16a including a shutter (not shown) and has a photographing aperture 16b (see FIG. 1) which extends through a center of the shutter housing 16a in the optical axis direction. A shutter actuator provided in the shutter unit 16 drives the above-mentioned shutter to open and shut the photographing aperture 16b. The shutter housing 16a is provided, at three different circumferential positions on the outer periphery of the shutter housing 16a, with three spring hook projections 16c (only one of which is shown in FIGS. 1 and 2), respectively, and is provided on a rear surface thereof with two movement limit projections (movement limiter) 16d and three ball support holes 16e. The ball support holes 16e are bottomed holes which are open toward the rear (see FIG. 13).

Figure 13:
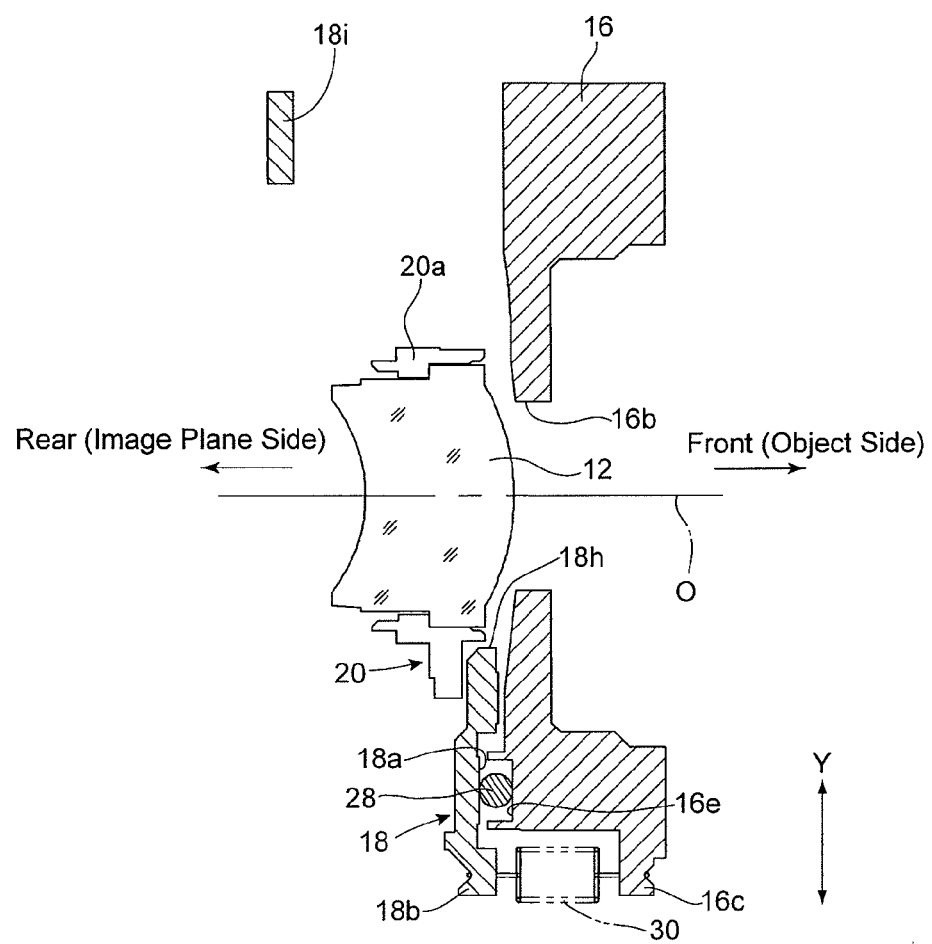
FIG. 13 is a sectional view taken along the line A-A shown in FIG. 12.

The anti-shake frame 18 is supported at the rear of the shutter unit 16. As shown in FIG. 13, three ball contact surfaces 18a are formed on the front of the anti-shake frame 18 that faces the shutter unit 16, and three guide balls (anti-shake guide members) 28 are held between the three ball contact surfaces 18a and the bottoms of the three ball support holes 16e, respectively. As mentioned above, the shutter unit 16 is provided with the three ball support holes 16e, and the three ball contact surfaces 18a and the three guide balls 28 are provided to correspond to the three ball support holes 16e. The three ball contact surfaces 18a are flat surfaces which lie in a plane substantially orthogonal to the photographing optical axis O. The three guide balls 28 are loosely fitted in the three ball support holes 16e, respectively, so that there is a clearance between each guide ball 28 and the inner wall of the associated ball support hole 16e in directions substantially orthogonal to the photographing optical axis O. When positioned in the vicinity of the center of the associated support hole 16e, each guide ball 28 does not come in contact with the inner wall of the associated ball support hole 16e.

The anti-shake frame 18 is provided, at three different circumferential positions on the outer periphery thereof, with three spring hook projections 18b, respectively, and three extension springs (anti-shake frame biasing member/first biaser) 30 are extended and installed between the three spring hook projections 18b and the three spring hook projections 16c, respectively. The anti-shake frame 18 is biased in a direction to approach the shutter unit 16 (i.e., is biased forward) by the biasing force of the three extension springs 30 to make the three ball contact surfaces 18a press against the three guide balls 28, respectively, to thereby prevent the anti-shake frame 18 from moving forward. In this state, the three ball contact surfaces 18a are in point contact with the three guide balls 28, respectively, and the anti-shake frame 18 can freely move in directions orthogonal to the photographing optical axis O by making the three ball contact surfaces 18a slidingly contact the three guide balls 28 (or while making the three guide balls 28 roll when the three guide balls 28 are not in contact with the inner walls of the three ball support holes 16e, respectively).

The anti-shake frame 18 is further provided with two movement limit holes (movement limiter) 18c into which the two movement limit projections 16d of the shutter unit 16 are inserted, respectively. As shown in FIGS. 6 through 12, the inner wall of each movement limit hole 18c is rectangular, generally square in shape in a plane substantially orthogonal to the photographing optical axis O. In the following descriptions, the direction of one of the two diagonal lines across the inner wall of each movement limit hole 18c in a plane orthogonal to the photographing optical axis O refers to the X-axis direction and the direction of the other diagonal line refers to the Y-axis direction. The anti-shake frame 18 can freely move relative to the shutter unit 16 (the linear moving ring 14) in a plane orthogonal to the photographing optical axis O within a range until the movement limit projections 16d come into contact with the inner walls of the two movement limit holes 18c, respectively.

The anti-shake frame 18 is driven by the anti-shake drive actuator 26. The anti-shake drive actuator 26 is provided with two coils 31 and 32 which are supported by the shutter unit 16, and is further provided with two permanent magnets 34 and 36 which are supported by the anti-shake frame 18. The two permanent magnets 34 and 36 are fixed to two magnet holding portions 18d and 18e, respectively, which are provided on the anti-shake frame 18. The permanent magnets 34 and 36 are substantially identical in shape and size to each other. Each of the permanent magnets 34 and 36 is in the shape of a narrow, thin rectangular plate. The permanent magnets 34 and 36 are arranged symmetrically with respect to an imaginary plane P (see FIGS. 6 through 12) which lies on the photographing optical axis O and is extends in the Y-axis direction. More specifically, opposite sides of a magnetic pole boundary line M1 (see FIGS. 8 and 11) of the permanent magnet 34 which extends in the lengthwise direction thereof and passes through an approximate center of the permanent magnet 34 with respect to the width thereof are magnetized into north and south poles, respectively, while opposite sides of a magnetic pole boundary line M2 (see FIGS. 8 and 11) of the permanent magnet 36 which extends in the lengthwise direction thereof and passes through an approximate center of the permanent magnet 36 with respect to the width thereof are magnetized into north and south poles, respectively. In other words, each of the magnetic pole boundary lines M1 and M2 define a boundary between north and south poles of each of the permanent magnets 34 and 36, respectively. The magnetic pole boundary line M1 of the permanent magnet 34 and the magnetic pole boundary line M2 of the permanent magnet 36 are inclined to each other so that the distance therebetween (i.e., the distance from the imaginary plane P) increases in an increasingly upward direction (toward a removed position of the insertable/removable frame 20 which will be discussed later) from the bottom end in the Y-axis direction (from an insertion position side of the insertable/removable frame 20 which will be discussed later). The inclination angle of each magnetic pole boundary line M1 and M2 with respect to the imaginary plane P is set to approximately 45 degrees. Namely, the lengthwise directions (the magnetic pole boundary lines M1 and M2) of the permanent magnets 34 and 36 are substantially orthogonal to each other.

Figure 8:
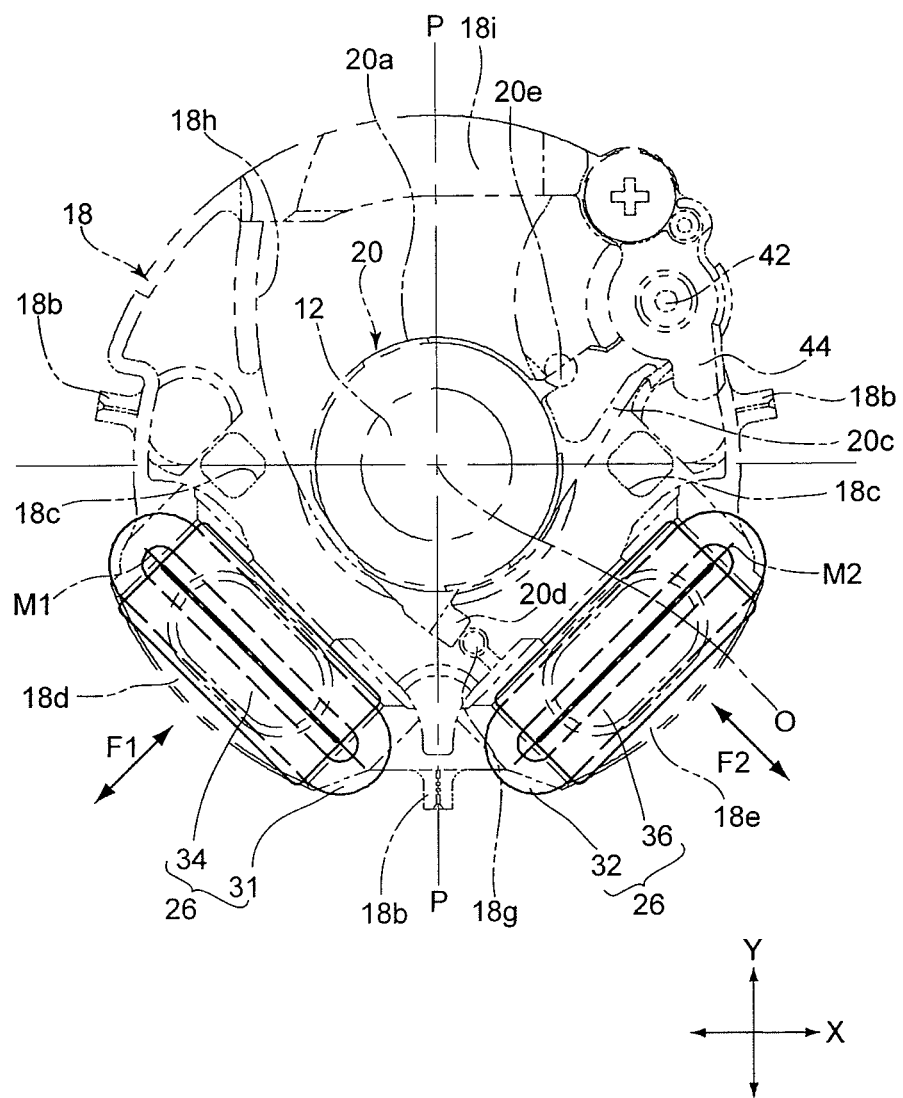
FIG. 8 is a diagram of the elements of an anti-shake drive actuator shown in FIG. 7 shown in a manner to emphasize these elements.
Figure 11:
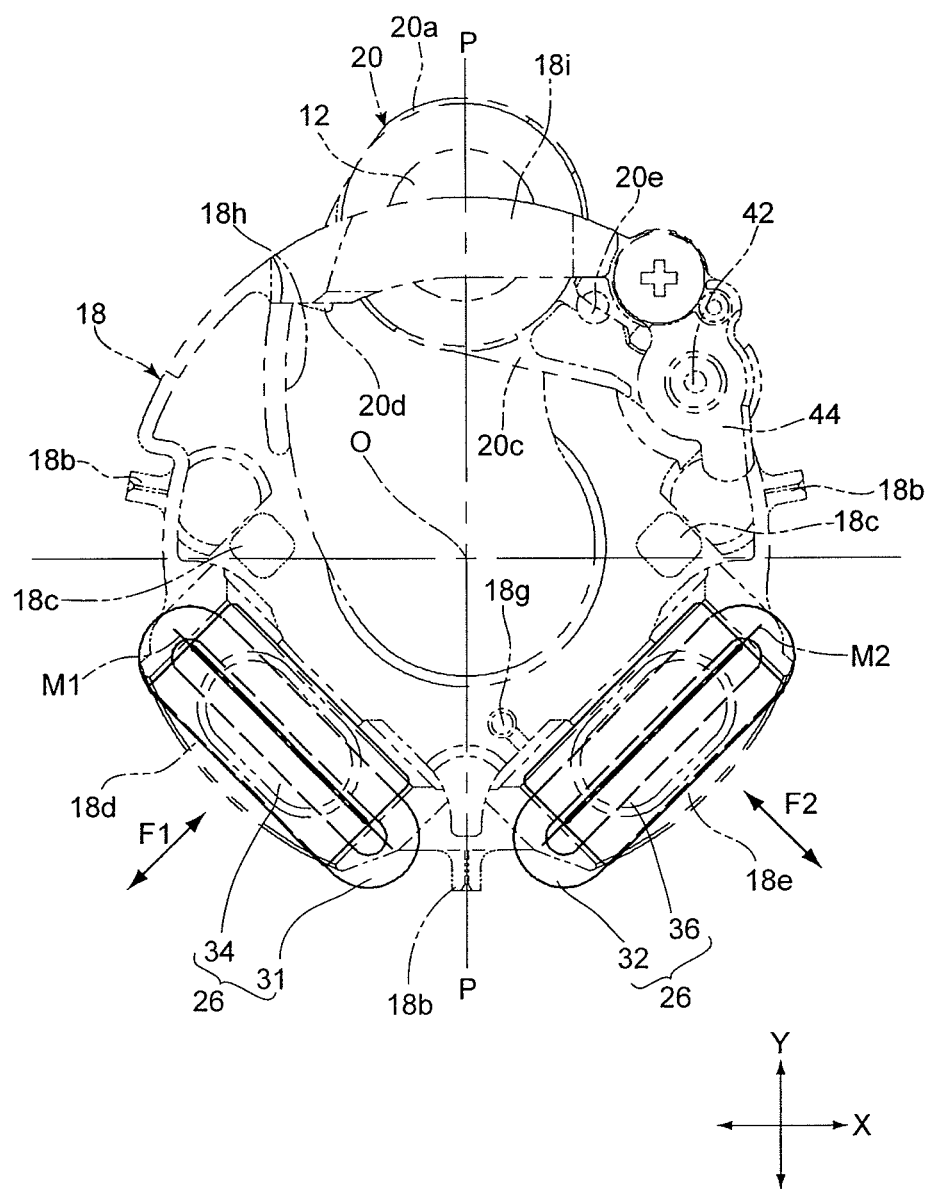
FIG. 11 is a diagram of the elements of the anti-shake drive actuator shown in FIG. 10 shown in a manner to emphasize these elements.
Figure 12:
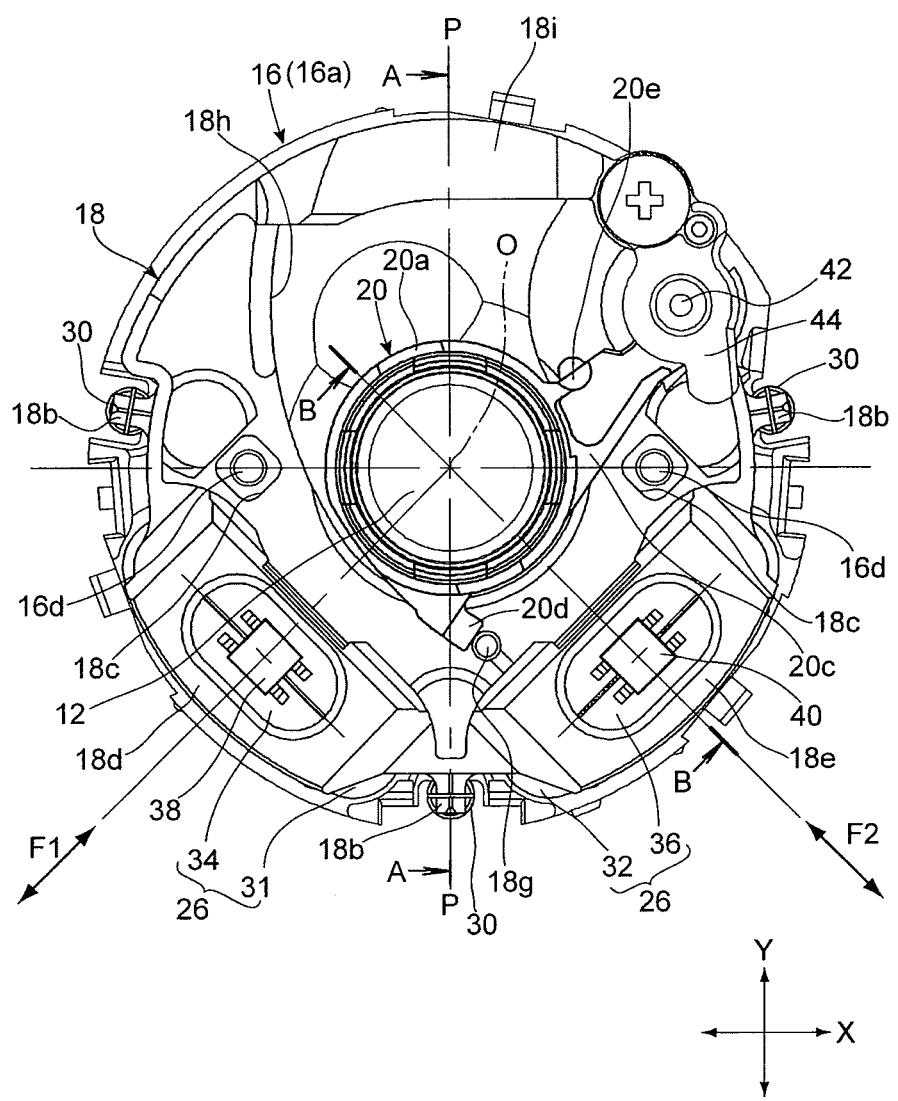
FIG. 12 is a rear elevational view of the anti-shake lens unit in the ready-to-photograph state with the linear moving ring and the sensor holder removed, viewed from the image plane side.

As shown in FIGS. 1, 8 and 11, each of the coils 31 and 32 is an air-core coil which includes a pair of elongated portions that are substantially parallel to each other and a pair of curved (U-shaped) portions which connect the pair of elongated portions at respective ends thereof. The coils 31 and 32 are substantially identical in shape and size to each other. The shutter housing 16a is provided on the rear thereof with a pair of positioning projections 16f and a pair of positioning projections 16g (see FIG. 1). The coil 31 is supported on the shutter unit 16 with the pair of positioning projections 16f engaged into the air-core portion of the coil 31, and the coil 32 is supported on the shutter unit 16 with the pair of positioning projections 16g engaged into the air-core portion of the coil 32. In this supporting state, the lengthwise direction of the coil 31 is substantially parallel to the magnetic pole boundary line M1 and the lengthwise direction of the coil 32 is substantially parallel to the magnetic pole boundary line M2. The coils 31 and 32 are connected to a flexible PWB (printed wiring board (not shown)) which extends from the shutter unit 16, and are further connected to a control circuit board of the camera, in which the present embodiment of the anti-shake lens unit 10 is incorporated, via another flexible PWB (not shown) provided inside the lens barrel. The control of power that is applied to the coils 31 and 32 is performed by a control circuit on the above-mentioned control circuit board.

Figure 14:
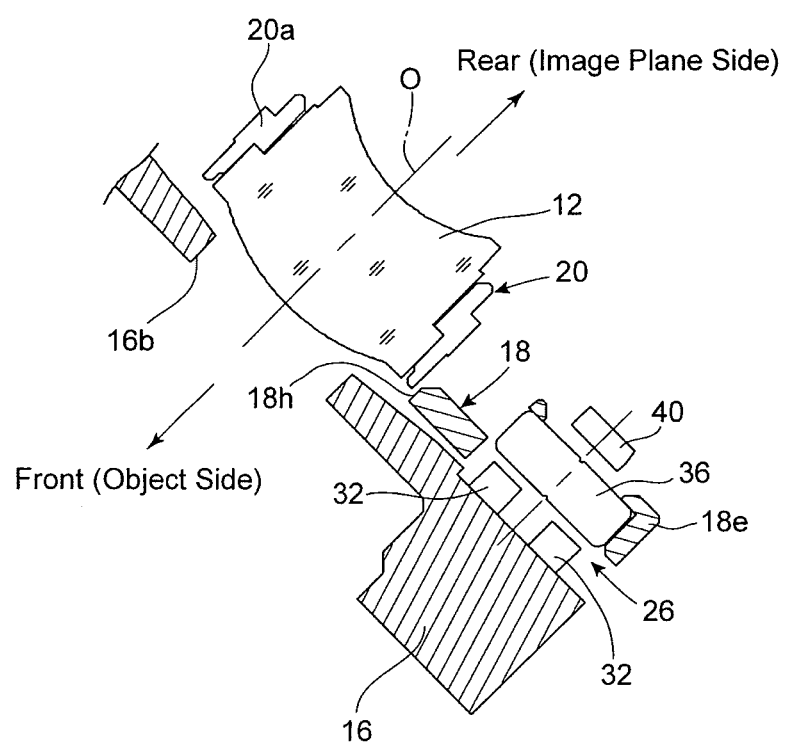
FIG. 14 is a sectional view taken along the line B-B shown in FIG. 12.

In the anti-shake drive actuator 26 that has the above described structure, the coil 31 and the permanent magnet 34 face each other in the optical axis direction, and a driving force is generated in a direction substantially orthogonal to the magnetic pole boundary line M1 of the permanent magnet 34 (i.e., orthogonal to the lengthwise direction of the coil 31) in a plane orthogonal to the optical axis O upon the coil 31 being energized. The direction of action of this driving force is shown by a double-headed arrow F1 in FIGS. 8, 11 and 12. In addition, the coil 32 and the permanent magnet 36 face each other in the optical axis direction as shown in FIG. 14, and a driving force is generated in a direction substantially orthogonal to the magnetic pole boundary line M2 of the permanent magnet 36 (i.e., orthogonal to the lengthwise direction of the coil 32) in a plane orthogonal to the optical axis O upon the coil 32 being energized. The direction of action of this driving force is shown by a double-headed arrow F2 in FIGS. 8, 11 and 12. The direction of action of each of the two aforementioned driving forces intersects both the X-axis direction and the Y-axis direction at an angle of approximately 45 degrees, so that the anti-shake frame 18 can be moved to any arbitrary position in a plane orthogonal to the photographing optical axis O by controlling the passage of current through each of the coils 31 and 32. As described above, the moving range of the anti-shake frame 18 is limited by engagement of the inner walls of the two movement limit holes 18c with the two movement limit projections 16d, respectively.

The sensor holder 22 is fixed to the rear of the anti-shake frame 18. The sensor holder 22 has a shape covering the rear sides of the two magnet holding portions 18d and 18e and supports two position detection sensors 38 and 40 that are respectively positioned behind the two permanent magnets 34 and 36. The position detection sensors 38 and 40 are connected to the aforementioned flexible PWB (not shown), which extends from the shutter unit 16, and are further connected to the aforementioned control circuit board of the camera, in which the present embodiment of the anti-shake lens unit 10 is incorporated, via the aforementioned other flexible PWB (not shown) provided inside the lens barrel. The drive position of the anti-shake frame 18 that is driven by the anti-shake drive actuator 26 can be detected via the position detection sensors 38 and 40.

The anti-shake lens unit 10 is provided with an insertable/removable frame 20 which is supported by the anti-shake frame 18 thereon to be rotatable (swingable) about a rotational shaft 42 that extends parallel to the photographing optical axis O. The front end of the rotational shaft 42 is fixedly fitted into a shaft support hole 18f formed in the anti-shake frame 18, and the rear end of the rotational shaft 42 is fixed to a retaining member 44 fixed to the anti-shake frame 18. The insertable/removable frame 20 is provided with a cylindrical lens holder portion 20a, a shaft bearing portion 20b and an arm portion 20c. The cylindrical lens holder portion 20a holds the insertable/removable image-stabilizing lens 12, the rotational shaft 42 is inserted into the shaft bearing portion 20b, and the cylindrical lens holder portion 20a and the shaft bearing portion 20b are connected via the arm portion 20c. The insertable/removable frame 20 is swingable (rotatable) about the rotational shaft 42 between the insertion position shown in FIGS. 2 through 8 and 12 and the removed position shown in FIGS. 9 through 11, and the insertion position is defined by engagement of a stopper contact portion 20d formed on the cylindrical lens holder portion 20a with a stopper 18g formed on the anti-shake frame 18. The insertable/removable frame 20 is biased toward the insertion position by an insertable/removable frame biasing spring (insertable/removable-frame biasing member/second biaser) 46. The insertable/removable frame biasing spring 46 is configured of a torsion coil spring, the ends of which are hooked onto the anti-shake frame 18 and the insertable/removable frame 20, respectively. In addition, an optical-axis-direction biasing spring 48 configured of a compression spring is installed between the shaft bearing portion 20b and the retaining member 44, and the insertable/removable frame 20 is biased forward by the optical-axis-direction biasing spring 48 so that the position of the insertable/removable frame 20 in the optical axis direction is stabilized.

When the insertable/removable frame 20 is in the insertion position, the insertable/removable image-stabilizing lens 12 is positioned on the photographing optical axis O. When the insertable/removable frame 20 rotates to the removed position in a state where the anti-shake frame 18 is at the movement limit thereof in the Y-axis direction (hereinafter referred to as the removal assisting position), in which the end of the inner wall of the movement limit holes 18c of the anti-shake frame 18 on the insertion position side (the lower end of the inner wall of each movement limit hole 18c with respect to FIGS. 6 through 12) comes into contact with the associated movement limit projection 16d, the center of the insertable/removable image-stabilizing lens 12 is displaced from the photographing optical axis O in the Y-axis direction. A clearance hole 18h, the shape of which corresponds to the path of movement of the cylindrical lens holder portion 20a that is defined by the arc-shaped path about the rotational shaft 42, is formed through the anti-shake frame 18, and the front end of the cylindrical lens holder portion 20a is positioned in the clearance hole 18h when the insertable/removable frame 20 is at the removed position. The clearance hole 18h is open at (extends through) a portion of the outer periphery of the anti-shake frame 18, and the anti-shake frame 18 is provided over this opening portion with a reinforcing bridge 18i. As can be seen in FIGS. 1 and 2, the reinforcing bridge 18i is offset rearwardly to be prevented from interfering with the cylindrical lens holder portion 20a when the insertable/removable frame 20 rotates to the removed position.

The removal drive lever 24 is positioned in the linear moving ring 14 and supported thereby to be rotatable (swingable) about a rotational shaft 50 that is parallel to the photographing optical axis O. The rotational shaft 50 is formed integral with the linear moving ring 14 so as to be positioned in the vicinity of the rotational shaft 42. The rotational shaft 50 is inserted into a shaft hole formed through a shaft bearing portion 24a of the removal drive lever 24. A retaining plate 52 is fixed to the rear of the linear moving ring 14 to prevent the removal drive lever 24 from moving rearward. The removal drive lever 24 is provided with an arm portion 24b which extends radially from the shaft bearing portion 24a and is further provided in the vicinity of the free end of the arm portion 24b with a removal pressing portion 24c that is capable of coming into contact with a pressing-force receiving part 20e formed on the arm portion 20c of the insertable/removable frame 20.

Figure 6:
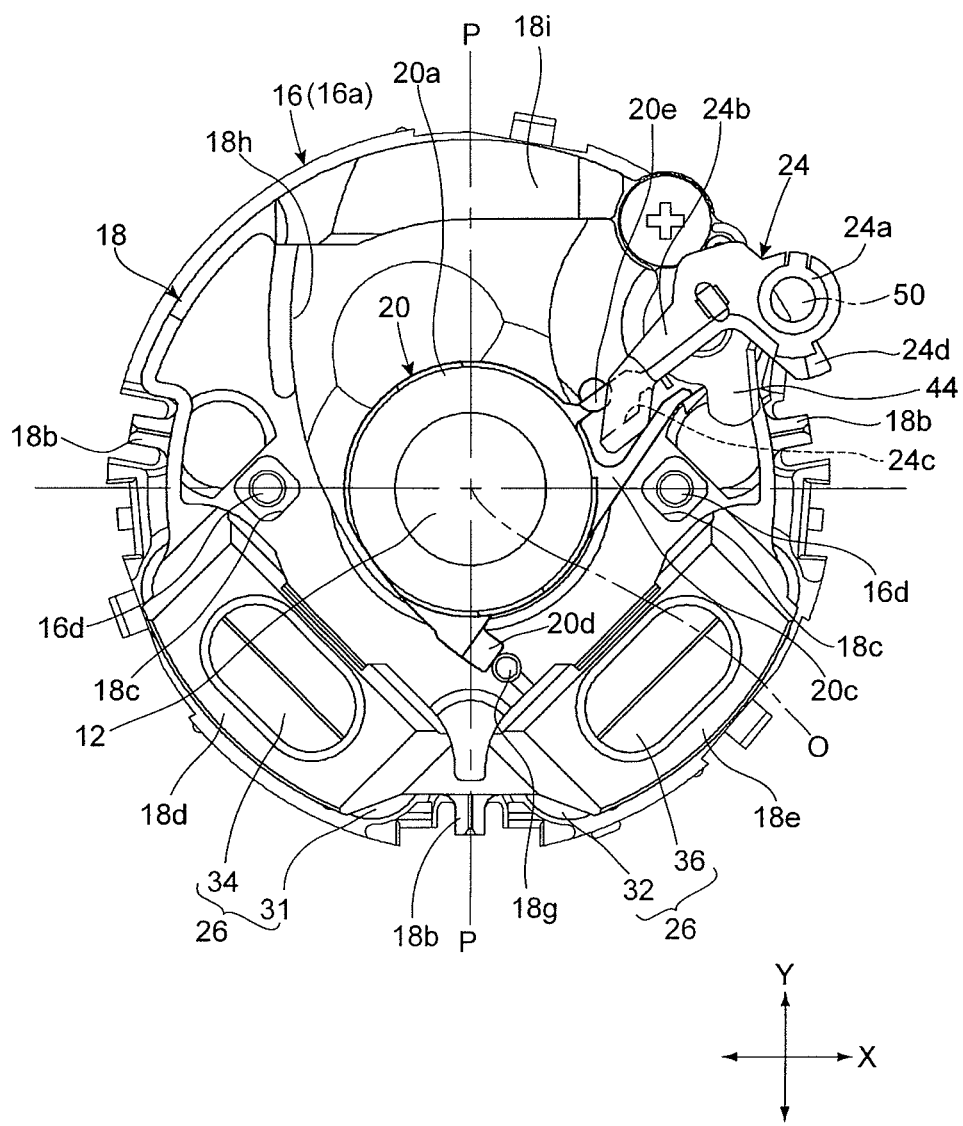
FIG. 6 is a rear elevational view of part of the anti-shake lens unit in the ready-to-photograph state of the lens barrel, viewed from the image plane side.
Figure 7:
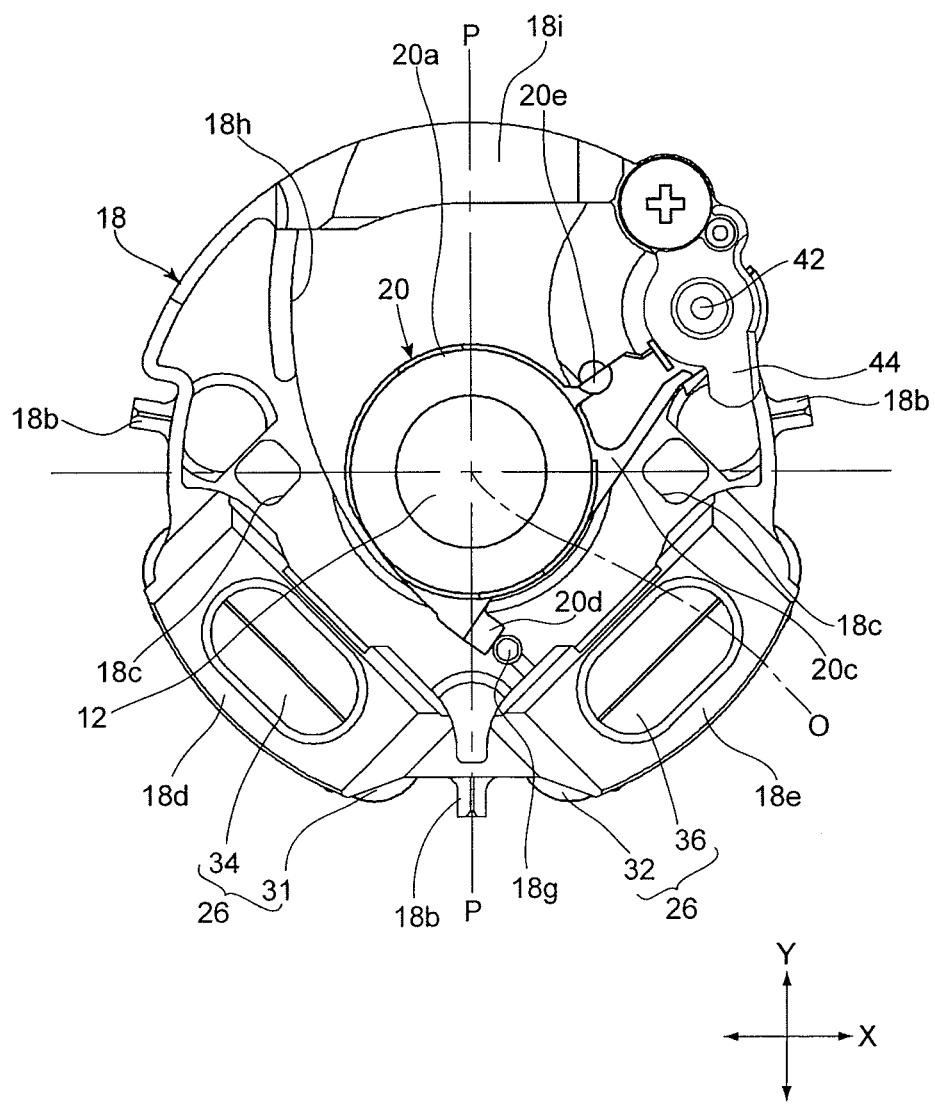
FIG. 7 is a rear elevational view that shows elements of the anti-shake lens unit shown in FIG. 6 which are driven during an image-stabilizing operation and coils shown in FIG. 6.

The biasing force of the insertable/removable frame biasing spring 46 urges the insertable/removable frame 20 to rotate toward the insertion position from the removed position (counterclockwise direction with respect to FIGS. 6 through 12), and the removal drive lever 24 is also biased to rotate in the same direction (counterclockwise direction with respect to FIGS. 6 through 12) by a removal drive lever biasing spring 54. A stopper (not shown) which determines the rotation limit of the removal drive lever 24 in the biasing direction of the removal drive lever biasing spring 54 is formed on the inside of the linear moving ring 14. On the other hand, rotation of the insertable/removable frame 20 in the biasing direction of the insertable/removable frame biasing spring 46 is limited by engagement between the stopper contact portion 20d and the stopper 18g. FIG. 6 shows a state where the insertable/removable frame 20 and the removal drive lever 24 are in contact with the stopper 18g and the aforementioned stopper (not shown) of the linear moving ring 14, respectively, and at this stage the pressing-force receiving part 20e and the removal pressing portion 24c are spaced from each other (see FIGS. 4 and 5). The clearance between the pressing-force receiving part 20e and the removal pressing portion 24c is determined to be such a degree as to prevent the pressing-force receiving part 20e from coming in contact with the removal pressing portion 24c in the moving range of the anti-shake frame 18 relative to the shutter unit 16 (i.e., the aforementioned range until the movement limit projections 16d come into contact with the inner walls of the two movement limit holes 18c, respectively). In other words, the anti-shake lens unit 10 is configured so that the removal drive lever 24 does not interfere with either of the anti-shake driving operations of the anti-shake frame 18 and the insertable/removable frame 20 that are performed by the anti-shake drive actuator 26. If no external force is exerted on the insertable/removable frame 20 and the removal drive lever 24, the state shown in FIGS. 6 through 8, in which the insertable/removable frame 20 is held in the insertion position by the biasing force of the insertable/removable frame biasing spring 46, is maintained.

The removal drive lever 24 is provided in the vicinity of the shaft bearing portion 24a with a pressing-force receiving part 24d. A insertion/removal control-projection (removal drive mechanism/ pressing member) 58 (see FIG. 3) is a stationary member which is fixed to the inside of the lens barrel to be positioned behind the removal drive lever 24. Rearward movement of the linear moving ring 14 when the lens barrel moves from a ready-to-photograph state to the lens barrel accommodated state causes the insertion/removal control-projection 58 to come into contact with and press the pressing-force receiving part 24d to rotate the removal drive lever 24 in a direction toward the removed position of the insertable/removable frame 20 from the insertion position of the insertable/removable frame 20. More specifically, the insertion/removal control-projection 58 is provided at the front end thereof with an end-face cam 58a, and retracting movement of the linear moving ring 14 toward the insertion/removal control-projection 58 causes the pressing-force receiving part 24d to come into contact with the end-face cam 58a. Subsequently, a further retracting movement of the linear moving ring 14 with the pressing-force receiving part 24d remaining in contact with the end-face cam 58a causes a component force which makes the removal drive lever 24 rotate in a direction against the biasing force of the removal drive lever biasing spring 54 (in a direction toward the removed position of the insertable/removable frame 20) created from the rearward moving force of the linear moving ring 14 in the optical axis direction, so that the removal drive lever 24 solely rotates by an amount of rotation corresponding to the aforementioned clearance, which causes the removal pressing portion 24c to come into contact with the pressing-force receiving part 20e of the insertable/removable frame 20. Thereupon, the pressing force in the direction toward the removed position of the insertable/removable frame 20 is transmitted to the insertable/removable frame 20 via the removal pressing portion 24c and the pressing-force receiving part 20e, which causes the removal drive lever 24 to press and rotate the insertable/removable frame 20 toward the removed position against the biasing forces of both the insertable/removable frame biasing spring 46 and the removal drive lever biasing spring 54. After the insertable/removable frame 20 reaches the removed position, a removed-lens holding surface 58b which is formed on a side of the insertion/removal control-projection 58 to extend substantially parallel to the optical axis O is engaged with a side of the pressing-force receiving part 24d, so that the insertable/removable frame 20 is held in the removed position (see FIG. 9).

Operations of the anti-shake lens unit 10 that has the above described structure will be discussed hereinafter. In a ready-to-photograph state shown in FIGS. 6 through 8, the insertable/removable frame 20 is held at the insertion position by the biasing force of the insertable/removable frame biasing spring 46, and the center (optical axis) of the insertable/removable image-stabilizing lens 12 is coincident with the photographing optical axis O. In this ready-to-photograph state, deviations (image shake) of an object image focused on an image plane can be reduced by driving the insertable/removable image-stabilizing lens 12 in directions orthogonal to the photographing optical axis O by the anti-shake drive actuator 26 in accordance with the direction and magnitude of vibrations applied to the lens barrel (i.e. to the photographing optical system). More specifically, the angular velocities of the lens barrel are detected by gyro sensors, and are time-integrated to determine a moving angle, and subsequently, from this moving angle, the moving amounts of the image on the focal plane in the X-axis direction and in the Y-axis direction are calculated while the driving amounts and the driving directions of the insertable/removable image-stabilizing lens 12 (the anti-shake frame 18) for the respective axial directions are calculated in order to cancel out the image shake. Subsequently, the passage of current through each of the coils 31 and 32 is controlled in accordance with these calculated values. Thereupon, the anti-shake frame 18 is moved while being supported by the three guide balls 28 at the three ball contact surfaces 18a. When the anti-shake frame 18 is driven to perform an anti-shake driving operation, the insertable/removable frame 20 is held in the insertion position, in which the stopper contact portion 20d is made to contact the stopper 18g, so that the anti-shake frame 18 and the insertable/removable frame 20 (the insertable/removable image-stabilizing lens 12) integrally move.

In a ready-to-photograph state, it is possible to calibrate the position detection sensors 38 and 40 by utilizing information on the positions of movement limits of the anti-shake frame 18, where each of the two movement limit projections 16d comes into contact with the inner wall of the associated movement limit hole 18c of the anti-shake frame 18. The direction of action of each of the two driving forces F1 and F2, which are respectively generated by a combination of the coil 31 and the permanent magnet 34 and a combination of the coil 32 and the permanent magnet 36, intersects both the X-axis direction and the Y-axis direction at an angle of approximately 45 degrees. Accordingly, the movement limits of each movement limit hole 18c in the X-axis direction relative to the associated movement limit projection 16d (defined by the each laterally opposed corner (end) of each movement limit hole 18c coming into contact with the associated movement limit projection 16d) can be used as reference positions for driving the anti-shake frame 18 in the X-axis direction by the anti-shake drive actuator 26, and the movement limits of each movement limit hole 18c in the Y-axis direction relative to the associated movement limit projection 16d (defined by each vertically opposed corner (end) of each movement limit hole 18c coming into contact with the associated movement limit projection 16d) can be used as reference positions for driving the anti-shake frame 18 in the Y-axis direction by the anti-shake drive actuator 26. A practical anti-shake driving range of the anti-shake frame 18 in a ready-to-photograph state is defined within a range in which each movement limit projection 16d does not come into contact with the inner wall of the associated movement limit hole 18c.

When the lens barrel moves from a ready-to-photograph state to the lens barrel accommodated state, the anti-shake lens unit 10 (the linear moving ring 14) is moved rearward in the optical axis direction by a motor (not shown) for driving the whole lens barrel forward and rearward, and the pressing-force receiving part 24d of the removal drive lever 24 which retracts with the linear moving ring 14 comes in contact with the end-face cam 58a of the insertion/removal control-projection 58. A further rearward movement of the linear moving ring 14 causes the pressing-force receiving part 24d to be pressed by the end-face cam 58a. Thereupon, a component force is produced from the retracting force of the linear moving ring 14, so that the removal drive lever 24 is rotated against the biasing force of the removal drive lever biasing spring 54 to thereby cause the removal pressing portion 24c to come into contact with the pressing-force receiving part 20e. The insertable/removable frame 20 is acted upon by a biasing force of the insertable/removable frame biasing spring 46 toward the insertion position as described above, and the removal drive lever 24 with the removal pressing portion 24c in contact with the pressing-force receiving part 20e presses the insertable/removable frame 20 toward the removed position from the insertion position against the biasing force of the insertable/removable frame biasing spring 46. In addition, the anti-shake frame 18, which supports the insertable/removable frame 20, is acted upon by the biasing force of the three extension springs 30 in a direction to press the three ball contact surfaces 18a against the three guide balls 28. Namely, the insertable/removable frame biasing spring 46 and the extension spring 30 exert spring resistance on movements of the insertable/removable frame 20 and the anti-shake frame 18, respectively. Here the rotational resistance of the insertable/removable frame 20 that is caused by the insertable/removable frame biasing spring 46 is predetermined to be greater than the resistance to movement of the anti-shake frame 18 that is caused by the extension spring 30. Therefore, the pressing force acting on the insertable/removable frame 20 is transmitted to the anti-shake frame 18, thus causing the anti-shake frame 18 to move with the insertable/removable frame 20 toward the removed position before the commencement of rotation of the insertable/removable frame 20 toward the removed position. Subsequently, the anti-shake frame 18 is moved to the removal assisting position (shown in FIGS. 9 through 11), in which the end of the inner wall of each of the two movement limit holes 18c of the anti-shake frame 18 on the insertion position side in the Y-axis direction comes into contact with the associated movement limit projection 16d. Since the aforementioned practical anti-shake driving range of the anti-shake frame 18 in a ready-to-photograph state includes no points where the inner wall of each movement limit hole 18c comes into contact with the associated movement limit projection 16d as described above, the removal assisting position is positioned outside the anti-shake driving range. Immediately after the anti-shake frame 18 is prevented from moving beyond the removal assisting position after reaching the removal assisting position, the insertable/removable frame 20 is solely rotated from the insertion position to the removed position. Accordingly, the movement of the insertable/removable image-stabilizing lens 12 to the removed position thereof (shown in FIGS. 9 through 11) is performed as the result of a combination of the movement of the anti-shake frame 18 to the removal assisting position in the Y-axis direction and the rotation of the insertable/removable frame 20 to the removed position.

Figure 9:
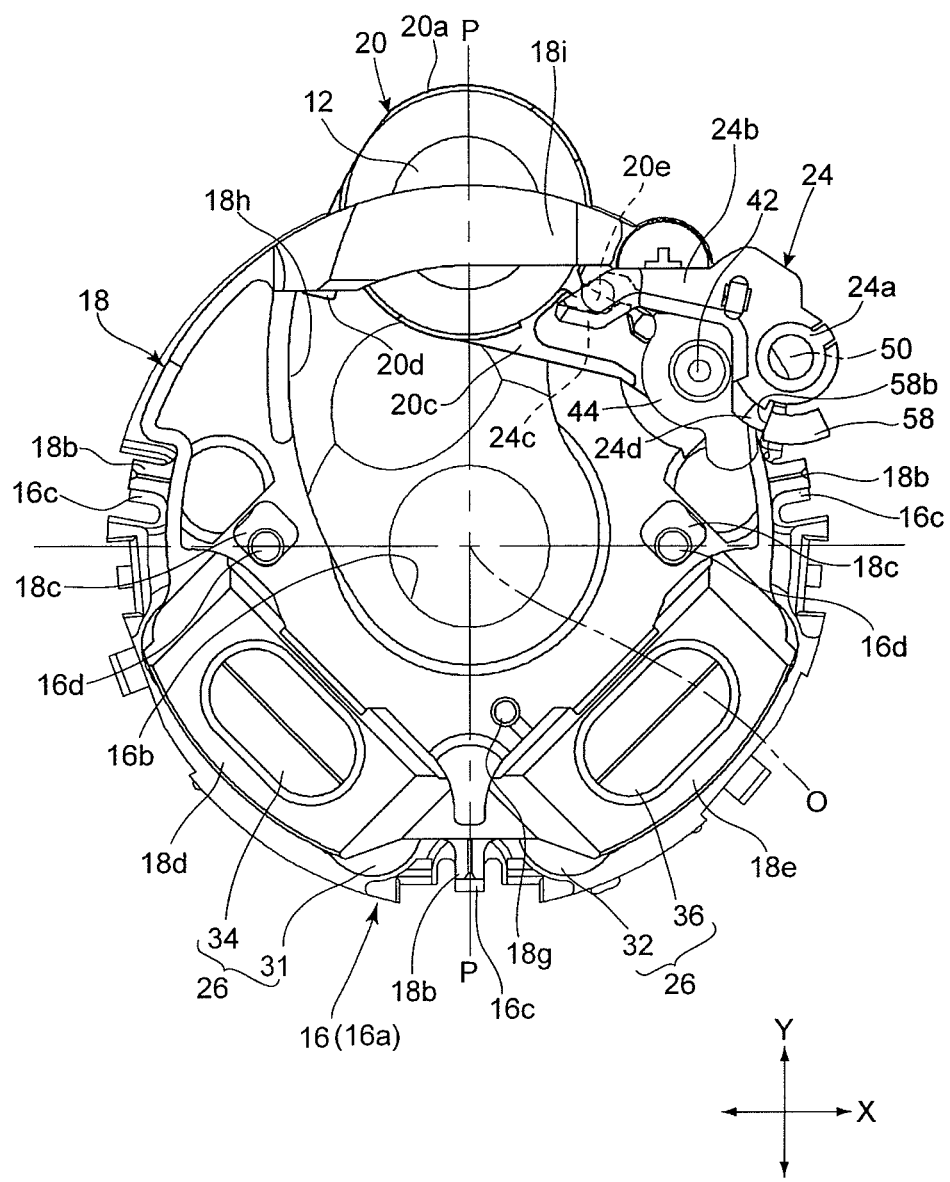
FIG. 9 is a rear elevational view of the portion of the anti-shake lens unit shown in FIG. 6 in a lens barrel accommodated state (fully-retracted state) of the lens barrel.
Figure 10:
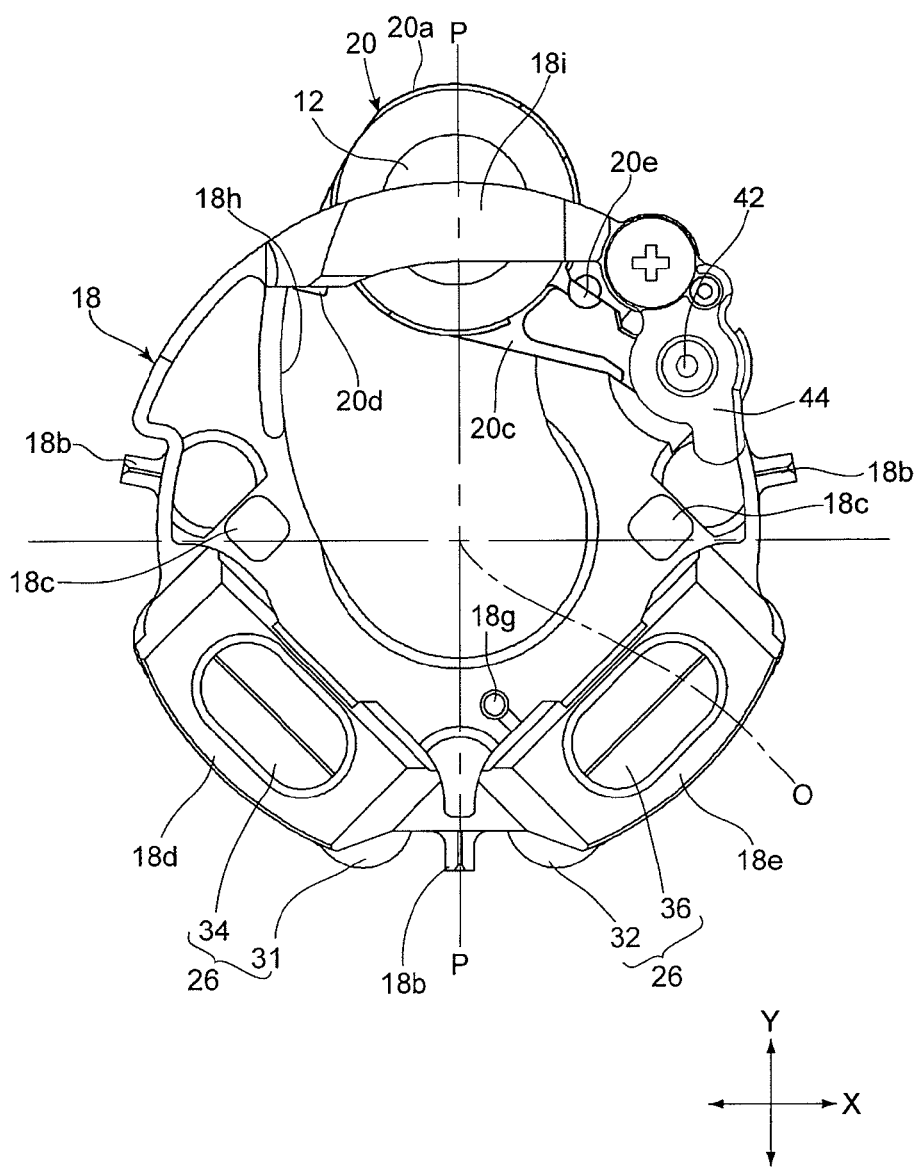
FIG. 10 is a rear elevational view of elements of the anti-shake lens unit shown in FIG. 9 which are driven during an image-stabilizing operation and the coils shown in FIG. 9.

The insertable/removable image-stabilizing lens 12 is removed from a position on an optical path (the photographing optical axis O) as shown in FIGS. 9 through 11 due to the movement of the anti-shake frame 18 to the removal assisting position and the rotation of the insertable/removable frame 20 to the removed position. A further rearward movement of the linear moving ring 14 causes the removed-lens holding surface 58b of the insertion/removal control-projection 58 to come in contact with the pressing-force receiving part 24d of the removal drive lever 24 (see FIG. 9), so that the insertable/removable frame 20 together with the removal drive lever 24 is held in the removed position by the insertion/removal control-projection 58 and is prevented from rotating toward the insertion position. Although not shown in the drawings, upon the lens barrel reaching the lens barrel accommodated state, a member positioned behind the insertable/removable image-stabilizing lens 12 (e.g., an optical element other than the insertable/removable image-stabilizing lens 12 which is positioned behind the insertable/removable image-stabilizing lens 12 in a ready-to-photograph state) enters an open space created by a removal of the insertable/removable image-stabilizing lens 12 (the cylindrical lens holder portion 20a). This structure makes it possible to reduce the length of the lens barrel in the optical axis direction in the lens barrel accommodated state of the lens barrel to a smaller degree than a type of lens barrel in which a plurality of optical elements are retracted and accommodated in line along the optical axis thereof.

Conversely, when the lens barrel moves from the lens barrel accommodated state to a ready-to-photograph state, the linear moving ring 14 is moved forward to thereby release the pressing force of the insertion/removal control-projection 58 against the removal drive lever 24, which causes the removal drive lever 24 to return to the position shown in FIG. 6 by the biasing force of the insertable/removable frame biasing spring 46. Thereupon, the biasing force of the insertable/removable frame biasing spring 46 causes the insertable/removable frame 20 to rotate from the removed position to the insertion position. In association with this rotation, the holding of the anti-shake frame 18 in the removal assisting position is also released, which brings the anti-shake frame 18 into a state where it can be driven by the anti-shake drive actuator 26. Thereafter, upon the lens barrel moving to a ready-to-photograph state, the aforementioned calibration operation for the position detection sensors 38 and 40 is performed.

In the above-described anti-shake lens unit 10, when the insertable/removable frame 20 is rotated from the insertion position to the removed position, the anti-shake frame 18 that supports the insertable/removable frame 20 is also moved to the removal assisting position, and accordingly, the amount of movement of the insertable/removable image-stabilizing lens 12 from the position on the photographing optical axis O to the removed position in the Y-axis direction is equal to a combination of a rotation of the insertable/removable frame 20 and a movement of the anti-shake frame 18, which makes it possible to remove the insertable/removable image-stabilizing lens 12 to the removed position by a greater amount than the case where only the insertable/removable frame 20 rotates. In other words, the swinging radius of the insertable/removable frame 20 can be made small with respect to the amount of movement of the insertable/removable image-stabilizing lens 12 from the position on the photographing optical axis O to the removed position, which makes it possible to achieve miniaturization of the removal drive mechanism.

In addition, in the lens barrel accommodated state of the lens barrel, the anti-shake frame 18 can be prevented from rattling because the insertable/removable frame 20 (the removal drive lever 24) applies a pressing force onto the anti-shake frame 18 with one end of the inner wall of each movement limit hole 18*c* of the anti-shake frame 18 in the Y-axis direction being in contact with the associated movement limit projection 16*d*.

Additionally, since the removal assisting position is set outside the practical anti-shake driving range of the anti-shake frame 18 in a ready-to-photograph state, even if a severe impact is applied to the lens barrel in the lens barrel accommodated state to thereby cause the guide balls 28 to dent the three ball contact surfaces 18*a*, the influence of the dents can be prevented from being exerted on the anti-shake drive performance in a ready-to-photograph state of the lens barrel.

Although the present invention has been discussed with reference to the above described embodiment, the present invention is not limited to this particular embodiment. For instance, upon receiving a pressing force from the removal drive lever 24 when the lens barrel is accommodated, first the anti-shake frame 18 moves to the removal assisting position and subsequently the insertable/removable frame 20 alone rotates to the removed position; however, the sequence of such operations can be performed in a reverse order. For instance, the resistance to movement of the anti-shake frame 18 that is caused by the extension spring 30 can be set to be greater than the rotational resistance of the insertable/removable frame 20 that is caused by the insertable/removable frame biasing spring 46, while a stopper which determines the rotation limit of the insertable/removable frame 20 in the rotation direction thereof toward the removed position can be provided on the anti-shake frame 18. According to this configuration, upon receiving a pressing force from the removal drive lever 24 when the lens barrel is accommodated, first the insertable/removable frame 20 rotates to the removed position and thereupon is prevented from further rotating by the aforementioned stopper, and thereafter the anti-shake frame 18 together with the anti-shake frame 20 can move to the removal assisting position.

Although it is the shutter unit 16 that supports the anti-shake frame 18 in a manner to be movable in directions orthogonal to the optical axis direction in the above illustrated embodiment, the support member for the anti-shake frame can be any other member. For instance, the anti-shake frame 18 can be movably supported by a flange formed integral with the inside of the linear moving ring 14.

Although the above described structure in which the insertable/removable frame 20 is pressed toward the removed position via the removal drive lever 24 is advantageous for miniaturization of the insertable/removable frame 20, an embodiment in which the insertable/removable frame 20 is directly pressed by an element corresponding to the insertion/removal control-projection 58 is also possible.

Although the insertion/removal frame 20 is pivotally supported by the anti-shake frame 18 thereon via the rotational shaft 42 in the above illustrated embodiment, the insertion/removal frame 20 can be replaced by a linearly movable member which is linearly movable along the Y-axis direction with respect to the anti-shake frame 18.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A position controller for an image-stabilizing optical element which is provided in a photographing optical system which moves between a ready-to-photograph state and an accommodated state in which no pictures are taken, said position controller comprising:
    an advancing/retracting member movable in an optical axis direction of said photographing optical system, wherein said advancing/retracting member is moved between a first position at which said photographing optical system is in said ready-to-photograph state and a second position at which said photographing optical system is in said accommodated state;
    an anti-shake frame supported by said advancing/retracting member to be movable along a plane orthogonal to said optical axis;
    an insertable/removable frame which holds said optical element and is supported by said anti-shake frame to be movable between an insertion position in which said optical element is positioned on said optical axis and a removed position in which said optical element is removed from said optical axis;
    an anti-shake drive mechanism which drives said anti-shake frame to perform an image-stabilizing operation in accordance with vibrations applied to said photographing optical system; and
    a removal drive mechanism which imposes no limitations on movements of said anti-shake frame and said insertable/removable frame that are caused by said anti-shake drive mechanism in said ready-to-photograph state, and which imparts a component force that makes said insertable/removable frame move to said removed position from a moving force of said advancing/retracting member to move said anti-shake frame in a direction toward said removed position in association with said insertable/removable frame when said advancing/retracting member moves in said optical axis direction from said first position to said second position.

2. The position controller according to claim 1, further comprising:
    an anti-shake guide member installed between said advancing/retracting member and said anti-shake frame, said anti-shake guide member allowing said anti-shake frame to move in said plane in a state of being held between said advancing/retracting member and said anti-shake frame;
    a first biaser which biases said advancing/retracting member and said anti-shake frame in directions along said optical axis to approach each other to make said anti-shake guide member remain held between said advancing/retracting member and said anti-shake frame;
    a second biaser which biases and moves said insertable/removable frame toward said insertion position; and
    a movement limiter which limits a moving range of said anti-shake frame at least toward said removed position, wherein a resistance to movement of said insertable/removable frame toward said removed position that is caused by said second biaser is greater than a resistance to movement of said anti-shake frame relative to said anti-shake guide member that is created by said first biaser, and wherein said removal drive mechanism continues moving said anti-shake frame with said insertable/removable frame in a direction to move said insertable/removable frame to said removed position until said anti-shake frame is prevented from moving by said movement limiter, and subsequently moves said insertable/removable frame solely to said removed position.

3. The position controller according to claim 2, wherein said movement limiter comprises:

a projection which projects from one of said advancing/retracting member and said anti-shake frame in said optical axis direction; and a hole which is formed in the other of said advancing/retracting member and said anti-shake frame so that said projection is loosely fitted in said hole.

4. The position controller according to claim 3, further comprising a position detection sensor which detects a position of said anti-shake frame that is driven by said anti-shake drive mechanism, wherein said position controller calibrates said position detection sensor with a position at which said projection comes into contact with an inner wall of said hole as a reference position.

5. The position controller according to claim 1, wherein said insertable/removable frame is supported by said anti-shake frame to be rotatable about a first rotational shaft that is parallel to said optical axis, wherein said removal drive mechanism comprises:

a rotational relay member which is supported by said advancing/retracting member to be rotatable about a second rotational shaft that is parallel to said first rotational shaft, said rotational relay member coming into contact with said insertable/removable frame by rotating toward said removed position; and a pressing member which comes into contact with and presses said rotational relay member to rotate said rotational relay member toward said removed position when said advancing/retracting member moves from said first position to said second position.

6. The position controller according to claim 5, wherein a clearance is formed between said rotational relay member and said insertable/removable frame to prevent said rotational relay member and said insertable/removable frame from coming in contact with each other when said anti-shake frame is driven by said anti-shake drive mechanism in said ready-to-photograph state.

7. The position controller according to claim 1, wherein said anti-shake drive mechanism comprises an electromagnetic actuator including at least one magnet and at least one coil.

8. The position controller according to claim 2, wherein said first biaser comprises at least one extension spring, and wherein said second biaser comprises a torsion coil spring.

* * * * *